United States Patent [19]

Shinohara

[11] 4,445,793
[45] May 1, 1984

[54] BEARING

[75] Inventor: Kazuyoshi Shinohara, Okayama, Japan

[73] Assignee: Matsushita Electric Industrial Co., Ltd., Osaka, Japan

[21] Appl. No.: 419,582

[22] Filed: Sep. 17, 1982

[30] Foreign Application Priority Data

Sep. 18, 1981 [JP] Japan ............................. 56-148567

[51] Int. Cl.³ ............................................. F16C 33/74
[52] U.S. Cl. .................................... 384/130; 384/373
[58] Field of Search ............... 384/130, 373, 292, 369, 384/398

[56] References Cited

U.S. PATENT DOCUMENTS

| | | | |
|---|---|---|---|
| 2,479,349 | 8/1949 | Hagg | 384/292 |
| 2,482,536 | 9/1949 | Bugatti | 384/398 |
| 3,393,610 | 7/1968 | Aarvold | 384/130 |
| 4,120,544 | 10/1978 | Hüber | 384/292 |

Primary Examiner—Lenard A. Footland
Attorney, Agent, or Firm—Burgess, Ryan & Wayne

[57] ABSTRACT

In a spiral groove bearing a gap between a surface portion which has grooves thereon and its opposing surface portion is smaller than the gap between any other surface portion which does not have grooves thereon and its opposing surface portion. A lubricant is disposed in the narrower gap. An oil repellent layer is applied to either the surface portion having grooves thereon or its opposing surface in the vicinity of the narrower gap.

20 Claims, 5 Drawing Figures

FIG. I
PRIOR ART
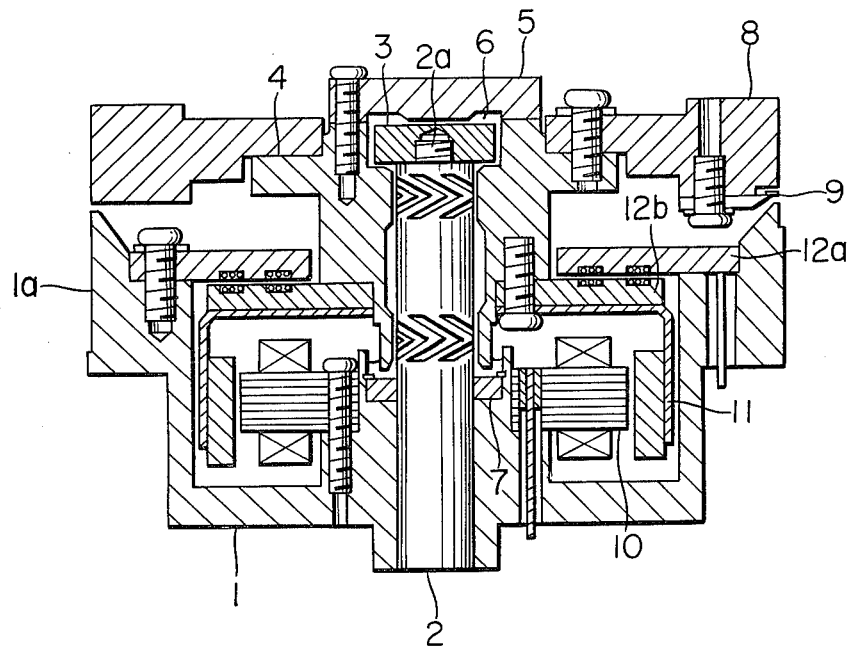
FIG. 2
PRIOR ART
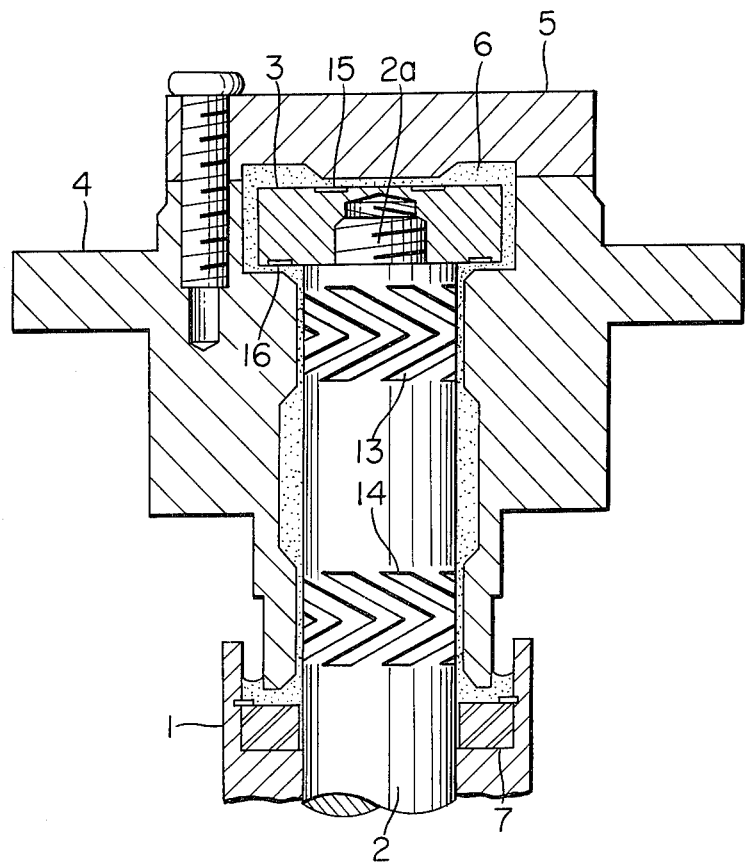

BEARING

BACKGROUND OF THE INVENTION

The present invention relates to a bearing and, more particularly, to a spiral groove bearing (to be referred to as an SGB for brevity hereinafter).

The SGB is a dynamic pressure hydrodynamic bearing and has a plurality of parallel and shallow grooves which are tilted in the direction such that a lubricating fluid flows from an external portion to a predetermined portion when one of two surfaces opposing each other in a bearing portion is moved relative to the other, or when both are moved relative to each other. The bearing of this type has been recently used in a wide variety of applications.

However, in a conventional SGB, several drawbacks are encountered which are described in detail with reference to DETAILED DESCRIPTION OF THE PRIOR ART.

SUMMARY OF THE INVENTION

It is, therefore, an object of the present invention to provide an SGB for a video tape recorder (to be referred to as a VTR for brevity hereinafter), which has a simple structure, thereby requiring a small number of components so as to decrease the cost and simplify the assembly, and which achieves high reliability and performance.

It is another object of the present invention to provide an SGB wherein a lubricant is held in the spiral groove portions only by capillarity.

It is still another object of the present invention to provide an SGB wherein an oil repellent prevents the lubricant from escaping along the surface of the bearing.

According to the present invention, a row of grooves or a set of grooves is formed on one or both of opposing surfaces of a stationary shaft and a cylindrical body with a bottom. The cylindrical body is rotatable about the stationary shaft. A gap between the surface portion of the stationary shaft and the opposing inner surface portion of the cylindrical body, at least one of which is grooved, is smaller than a gap between any other surface portion of the stationary shaft and the opposing surface portion of the cylindrical body. An oil repellent is applied to one or both of the surface portions of the stationary shaft and the cylindrical body, at least one of which is grooved, at one or both sides of the narrower gap in the direction of the center line of the shaft.

With the above structure, the oil repellent prevents a lubricant forming an oil film in the narrower gap from escaping along the surface of the bearing. Thus, the oil film is stably held. Furthermore, the lubricant is held only in the narrower gap at the groove portion by capillarity. As a result, the following advantages are presented:

(1) A usual oil can be used as a lubricant, and a magnetic fluid together with a magnet need not be used.

(2) When a predetermined amount of lubricant is lubricated into the vicinity of the spiral groove portion either before or after the bearing is assembled, an oil film is formed by capillarity. Furthermore, even if air bubbles are trapped in the oil film, the air bubbles can be readily eliminated by exposing the bearing as a whole in a vacuum atmosphere.

(3) Once the oil film is formed, air bubbles cannot be formed in the oil film due to capillarity.

BRIEF DESCRIPTION OF THE DRAWINGS

FIG. 1 shows a sectional view of a conventional bearing;

FIG. 2 shows a sectional view showing the principal portion of the bearing shown in FIG. 1;

DETAILED DESCRIPTION OF THE PRIOR ART

Figure 3:
FIGS. 3 and 4 show plan views of a thrust bearing portion of the bearing shown in FIG. 1.

FIG. 1 partially shows a conventional rotary head cylinder unit (to be referred to as a cylinder unit hereinafter) for a VTR which adopts an SGB.

A shaft 2 is fixed by interference shrinking to a lower cylinder block 1 which has a slidable surface 1a. A flange 3 meshes with an external thread portion 2a formed on the top of the shaft 2. A disc 4 together with a thrust support 5 surrounds the shaft 2 and the flange 3 putting a film of a lubricating oil 6 therebetween. The lubricating oil 6 comprises a magnetic fluid, a stable suspension of small magnetic particles. A magnet 7 prevents the lubricating oil 6 from escaping through the gap between the lower cylinder block 1 and the disc 4. An upper cylinder 8 mounted on the disc 4 has a head 9 which slides on the tape surface and records data on or reads it out from the tape. The upper cylinder 8 is rotated by an electromagnetic action by a motor stator 10 mounted on the lower cylinder block 1 and a motor rotor 11 mounted on the disc 4. An electrical signal received or supplied by the head 9 is received from or supplied to the external unit of the cylinder unit through a pair of rotary transmitters 12a and 12b. In FIG. 1, electrical wirings are not shown for illustrative convenience.

FIG. 2 shows a bearing portion of the bearing shown in FIG. 1. Two rows of V-shaped grooves 13 and 14 are formed on the shaft 2. The lubricating oil 6 flows in the V-shaped grooves 13 and 14 upon rotation of the disc 4. Therefore, a pressure is produced between the row of V-shaped grooves 13 and a cylinder surface portion opposite thereto and between the row of V-shaped grooves 14 and a cylinder surface portion opposite thereto. Radial bearings for the rotation of the disc 4 are formed between the rows of grooves 13 and 14 and their opposing surface portions.

Figure 4:
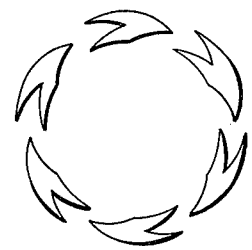

A set of spiral grooves 15 is formed on the upper surface of the flange 3, as shown in FIG. 3. A row of V-shaped grooves 16 is formed on the lower surface of the flange 3, as shown in FIG. 4. Furthermore, upon rotation of the disc 4 and the thrust support 5, a pressure is produced between the set of grooves 15 and their opposing surface portion and also between the row of grooves 16 and their opposing surface portion. Thus, the thrust bearing for the rotation of the disc 4 is formed.

The thrust support 5 contacts the upper surface of the flange 3 when the disc 4 does not rotate. However, upon rotation of the disc 4, the rotating portion is lifted to a position shown in FIG. 2 due to the pressure.

The radial gap between the row of grooves 13 and the row of grooves 14 and their opposing surface portions is generally set to 3 to 10 μm. The gap between the set of spiral grooves 15 and their opposing surface portion is set to 1 to 3 μm, and the gap between the row of grooves 16 and their opposing surface is set to 3 to 15 μm. The gap in any other part of the bearing is generally set to 0.2 to 1 mm in order to decrease friction moments due to the viscosity of the oil.

In the conventional bearing with the above construction, vibration and noise when the rotational portion is operated are less than in other conventional ball bearings. Further, the service life of this conventional SGB is longer than those of the other conventional ball bearings. However, the following problems are still presented.

(1) A magnetic fluid must be used as the lubricant, and a magnet must also be used to prevent the magnetic fluid from escaping to the outside.

(2) Although the lubricating, that is, the lubricating oil 6 expands by contraction and expansion of the air bubbles in the bearing portion in accordance with changes in the atmospheric pressure, assembly is time-consuming and the assembly cost is increased in order to eliminate air bubbles when the lubricating oil 6 is introduced and to prevent air from entering between the surfaces of the disc 4 and the thrust support 5.

(3) When the air bubbles are formed in the rows of grooves, the bearing cannot reach its rated performance.

DETAILED DESCRIPTION OF THE PREFERRED EMBODIMENT

Figure 5:
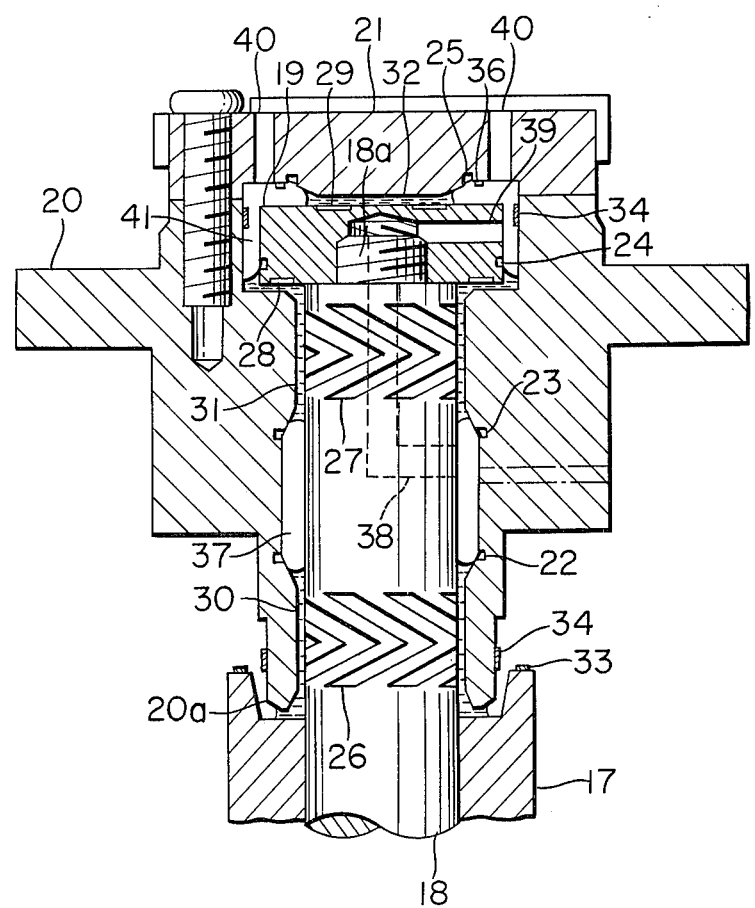
FIG. 5 shows a sectional view of a bearing portion of a bearing according to an embodiment of the present invention.

FIG. 5 is a sectional view of a bearing portion of the SGB according to an embodiment of the present invention. A shaft 18 is fixed to a lower cylinder block 17 in alignment with its central axis. A flange 19 is mounted on the shaft 18. A thrust support 21 is fixed to the top of a disc 20. The disc 20 and the thrust support 21 surround and are spaced apart from the shaft 18 and the flange 19, in the same manner as in FIG. 2.

Small grooves 22 and 23 respectively are formed in the inner surface of the disc 20, and small grooves 24 and 25 are formed in the outer surface of the flange 19 and the lower surface of the thrust support 21, respectively. The small grooves 22, 23, 24 and 25 are close to rows of V-shaped grooves 26, 27 and 28 and a set of spiral grooves 29 similar to those shown in FIG. 2.

The gap between opposing surface portions having a row or set of grooves therein is smaller than that between non-grooved surface portions. Oil films 30, 31 and 32 are formed respectively between the row of V-shaped grooves 26 and their opposing surface portion, between the row of V-shaped grooves 27 and their opposing surface portion, and between the set of spiral grooves 29 and their opposing surface portion. The lubricating oil which comprises the oil films 30, 31 and 32 is a general oil such as a diester oil or silicone oil, excluding a magnetic fluid. The lubricating oil is permeated by capillarity between the rows and set of grooves and their respective opposing surface portions and is permeated into the small grooves 22, 23, 24 and 25 in the vicinity of the gaps between the rows and set of grooves and their opposing surfaces. Each of these small grooves has a width of 0.1 to 0.8 mm and a depth of 0.3 to 1 mm so that the capillarity phenomenon tends to occur.

Oil repellents 33, 34 and 35 which contain a fluorine-containing resin as the base material, such as "Sumiflunon" (trade name of Sumitomo Chemical Co., Ltd.) and "Contracapilla" (trade name of Klueber Lubrication Co.), are coated on the peripheries of those parts in the vicinity of the oil films 30, 31 and 32. Thus, the lubricating oil which comprises the oil film may not escape.

Even though the amounts of oil of the oil films 30, 31 and 32 are decreased due to its evaporation, the oil in the small grooves automatically replenishes the oil films 30, 31 and 32 by capillarity since the gap corresponding to each of the oil films 30, 31 and 32 is smaller than the gap between the surface of the shaft 18 and each of the small grooves 22, 23, 24 and 25. A gap between a lower end 20a of the disc 20 and the lower cylinder block 17 functions as the small groove for the row of the grooves 26. As shown in FIG. 5, this gap is tapered toward the shaft 18. Thus, the oil film formed in this gap contracts toward the shaft 18.

However, with the above structure, air 37 trapped between the oil films 30 and 31 expands or contracts due to changes in atmospheric pressure and temperature. Thus, the oil film 30 or the like is displaced. However, according to the present invention, bores 38, 39 and 40 are respectively formed in the shaft 18, the flange 19 and the thrust support 21. Thus, the air 37 communicates with the atmospheric air. As may be apparent from FIG. 5, air 41 trapped between the oil films 31 and 32 also communicates with the atmospheric air.

What is claimed is:

1. A bearing comprising:
   two members having adjacent opposing surfaces which are movable relative to each other;
   a plurality of grooves formed on at least one of said surfaces,
   a lubricant held between said plurality of grooves and the other of said opposing surfaces, said plurality of grooves comprising a row of grooves oriented to cause said lubricant to flow in a desired direction when said surfaces move relative to each other,
   there being a first gap between (i) a portion of said at least one of said surfaces having said plurality of grooves formed thereon and (ii) the other of said opposing surfaces, which is smaller than a second gap between (a) other portions of said at least one of said surfaces which do not have said plurality of grooves thereon and (b) opposing surface portions of said other of said opposing surfaces; and
   an oil repellent layer applied to at least one of said surfaces adjacent said first gap.

2. The bearing according to claim 1, wherein said second gap comprises a groove in one of said opposing surfaces.

3. The bearing according to claim 2, wherein said groove is disposed substantially at the boundary between said first gap and said second gap.

4. The bearing according to claim 2, wherein said surfaces are cylindrical and concentric.

5. The bearing according to claim 4, wherein said groove is dimensioned to serve as a capillary brake.

6. The bearing according to claim 5, wherein said groove has a width in the range of 0.1 to 0.8 mm.

7. The bearing according to claim 6, wherein the depth of said groove is in the range of 0.3 to 1 mm.

8. The bearing according to claim 2, wherein said groove is dimensioned to serve as a capillary brake.

9. The bearing according to claim 8, wherein said groove has a width in the range of 0.1 to 0.8 mm.

10. The bearing according to claim 9, wherein the depth of said groove is in the range of 0.3 to 1 mm.

11. The bearing according to claim 1, wherein said surfaces are cylindrical and concentric.

12. The bearing according to claim 11, wherein said groove is dimensioned to serve as a capillary brake.

13. The bearing according to claim 12, wherein said groove has a width in the range of 0.1 to 0.8 mm.

14. The bearing according to claim 13, wherein the depth of said groove is in the range of 0.3 to 1 mm.

15. The bearing according to claim 1, wherein said second gap is dimensioned to serve as a capillary brake.

16. The bearing according to claim 15, wherein said groove has a width in the range of 0.1 to 0.8 mm.

17. The bearing according to claim 16, wherein the depth of said groove is in the range of 0.3 to 1 mm.

18. The bearing according to claim 1, wherein said layer comprises a fluorine-containing resin.

19. The bearing according to claim 1, wherein said second gap includes a portion having a width in the range of 0.1 to 0.8 mm.

20. The bearing according to claim 19, wherein the depth of said groove is in the range of 0.3 to 1 mm.

* * * * *